Dec. 20, 1949  C. W. TYSON  2,491,536
GAS-SOLID CONTACTING APPARATUS, INCLUDING
MEANS FOR STRIPPING SOLID PARTICLES
Filed Aug. 21, 1945   4 Sheets-Sheet 4

Charles W. Tyson Inventor
By  Young Attorney

Patented Dec. 20, 1949

2,491,536

UNITED STATES PATENT OFFICE 2,491,536

GAS-SOLID CONTACTING APPARATUS, INCLUDING MEANS FOR STRIPPING SOLID PARTICLES

Charles W. Tyson, Summit, N. J., assignor to Standard Oil Development Company, a corporation of Delaware Application August 21, 1945, Serial No. 611,871

8 Claims. (Cl. 23—288)

1

This invention relates to contacting solid particles with a gaseous fluid, and more particularly, relates to stripping volatile material from adsorbent catalyst or contact particles.

In many organic catalytic reactions the catalyst or contact particles become contaminated or fouled with organic deposits which may be removed in a regeneration step by burning before reusing the catalyst in another reaction step. When the catalyst or contact particles are removed from a reaction zone, they entrain vapors and gases, and it is preferred practice to strip out the volatile material from between the contact or catalyst particles before regeneration.

In the catalytic conversion of hydrocarbons, the catalyst or contact particles are removed from the reaction zone and stripped before being passed to the regeneration zone in order to remove hydrocarbon vapors before regenerating the catalyst particles. In the newer type of fluid catalyst conversion plants, the fouled catalyst or contact particles are removed as a dense fluidized mixture and stripped while they are in this condition with the result that stripping has not been as efficient as desired. With inefficient stripping, the entrained hydrocarbon vapors are passed to the regeneration zone with the fouled catalyst or contact particles and the hydrocarbon vapors are burned in the regeneration zone thereby burdening the regeneration zone and also losing recoverable hydrocarbons.

I have invented a new stripping vessel in which the usual annular stripping section is subdivided into cells by means of vertical radial partitions only in its lower portion where the stripping gas is introduced. The rest of the stripping vessel or the upper portion of the annular stripping section is subdivided into a multiplicity of small cells by substantially filling the said upper portion with a number of tiers of relatively deep arcuate cellular members arranged one above the other in spaced relation. The arcuate members in each tier have their ends in abutting relation and the bottom layer rests on the top of the partitions above mentioned. The members in the next higher plane have depending supporting or spacing means to space the next member in each nest a distance above the lowest member.

The supporting and spacing means is formed from rectangular flat metallic pieces or bars which extend transversely of the deep cellular member and extend down from the bottom face of the deep cellular member. Each spacer bar has its bottom surface resting on a cross bar of

2 the next lower deep cellular member and in alignment therewith to form, in effect, a partition extending from the bottom to the top of the cellular members.

In this way, the stripping section or zone is subdivided into a plurality of elongated cells by the cellular members themselves without the need of supplying partitions between nests of deep cellular members.

The deep cellular members may be made of any open mesh or lattice work material, but are preferably made by welding together a plurality of subway grating sections placed one on top another with the openings in alignment.

Figure 1:
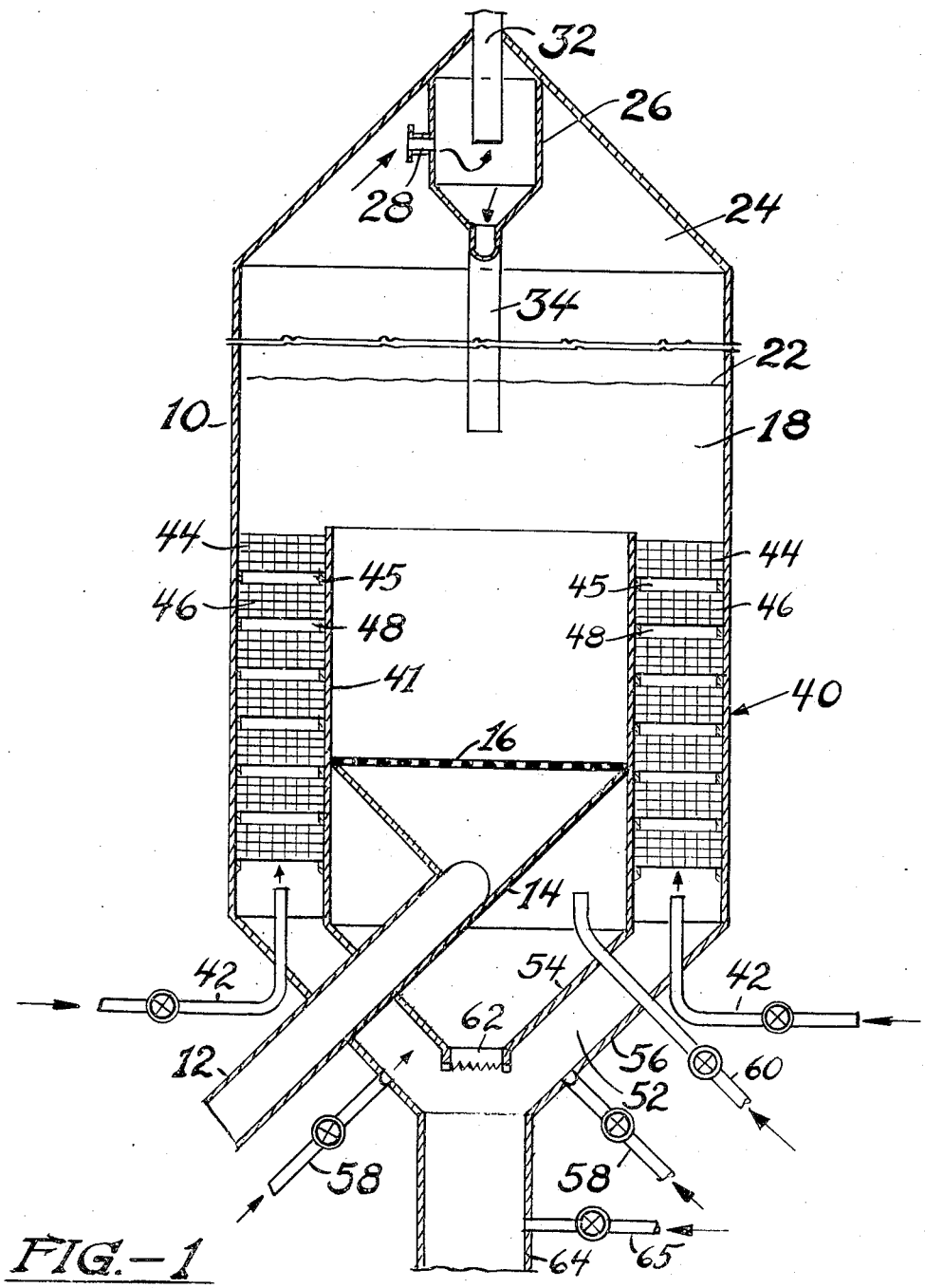
Fig. 1 represents a vertical longitudinal section through one form of reactor with parts omitted and parts diagrammatically shown to illustrate the general arrangement of my improved stripping vessel.

Referring now to the drawing, and more particularly to Fig. 1, the reference character 10 designates a reaction vessel in cylindrical form and provided with an inlet 12 for the introduction of reactants and powdered or finely divided catalytic or contact material. If desired, the reactants and catalytic material may be separately introduced into the reaction vessel 10. The reactants may be in vaporized form or in liquid form. If the reactants are in liquid form, a sufficient amount of hot regenerated catalytic or contact material must be mixed with the reactants to vaporize them and to supply the heat of reaction.

In the catalytic conversion of hydrocarbons, any suitable conversion catalyst may be used. In the catalytic cracking of hydrocarbons, any suitable cracking catalyst may be used, such as acid-treated bentonite, synthetic silica alumina gels, synthetic silica magnesia gels, etc. Preferably, the catalyst is in powdered condition with the particles of a size between about 200 and 400 standard mesh or even finer. The temperature during the catalytic conversion of hydrocarbons may be between about 350° F. and 1300° F. and for catalytic cracking of higher boiling hydrocarbons to produce gasoline, the cracking temperature may be between about 750° F. and 1050° F.

The inner end of the inlet line 12 is provided with a conical inlet member 14 provided at its upper portion with a horizontally arranged circular perforated grid or distribution member 16. The superficial velocity of the gases or vapors passing upwardly through the reaction vessel 10 may vary between about 0.3 ft./second and 3.0 ft./second. The superficial velocity is that velocity of the gas passing through the vessel when the vessel is empty and no solid particles are present.

With the selected velocity and with the catalyst or contact material of the particle size above described, the material will have a density of about 10 lbs./cu. ft. to 30 lbs./cu. ft. in the reaction vessel 10. The mixture is in a turbulent condition and has the appearance of a boiling liquid with a level indicated at 22. Above the level 22 is a dilute phase or dispersed phase 24 in which the vaporous reaction products passing upwardly from the dense bed or mixture 18 contain entrained solid particles. The density of the dilute phase is much less than that in the dense phase shown at 18.

The vapors or gases containing entrained solids are passed into separating means 26 through inlet line 28 for the separation of a large part of the entrained solids from the vapors or gases. The separating means is shown as a cyclone separator but other forms of separating means may be used such as Multiclones, etc. One or more separating means may be used and where more than one is used, they may be used in series or in parallel. The separating means is shown as arranged inside the upper part of the reaction vessel 10 but may be arranged outside of the reaction vessel 10.

The separated vapors or gases pass overhead through line 32 to any desired separation equipment for recovering desired products. In the catalytic conversion of hydrocarbons, the vaporous reaction products are passed to a fractionation system for recovering entrained catalyst and desired hydrocarbon products.

The separated solid particles are collected in the separating means 26 and returned to the dense bed or mixture 18 by dip leg or dip pipe 34 which extends below the level 22 of the dense fluidized mixture 18.

During the conversion of hydrocarbons, the catalyst or contact particles become fouled or contaminated and must be removed from the reaction vessel and regenerated before again being used. Before passing the contaminated particles to a regeneration zone, they are passed into the upper portion of my improved stripping zone 40 which is shown as an annular stripping vessel arranged between a smaller inner cylindrical member 41 and the lower portion of the inner wall of the reaction vessel 10. The cylindrical member 41 extends above and below the distribution plate 16 and has a diameter slightly greater than the diameter of the distribution plate 16.

Stripping gas is introduced into the bottom of the stripping zone or section 40 by a plurality of pipes 42. The stripping section is provided with a deep cellular member 44 below which is a space 45 and then below which is another deep cellular member 46. Below the deep cellular member 46 is another space 48. The rest of the stripping section is formed by alternate deep cellular members and spaces as will be hereinafter described in greater detail.

The stripped catalyst or contact material passes from the bottom of the stripping section 40 into passageway 52 formed between inverted conical member 54 and the botttom conical portion 56 of the reaction vessel 10. Stripping and fluidizing gas may be introduced into the downflowing catalyst or contact material through lines 58 which extend through the bottom portion 56 of the reaction vessel 10. This gas may be introduced to maintain the particles in fluidized condition as they flow through passage 52 but also a sufficient amount of gas may be introduced to effect additional stripping of the particles. The inverted conical member 54 is attached to the bottom of the inner cylindrical member 41 above described. The space between inverted cones 54 and 14 may be provided with a gas inlet pipe 60. Steam, or any suitable gas, may be injected so as to prevent catalyst entrance to this zone. The apex of the inverted conical member 54 may be provided with an opening 62 to permit the release of gas injected into the space between the conical members 14 and 54 to prevent the accumulation of powdered material in this space.

From the passage 52 the stripped particles pass into the upper portion of a standpipe 64 wherein the particles are maintained in a fluidized condition by the introduction of fluidizing gas at spaced points along the standpipe 64 as, for example, by line 65.

Figure 2:
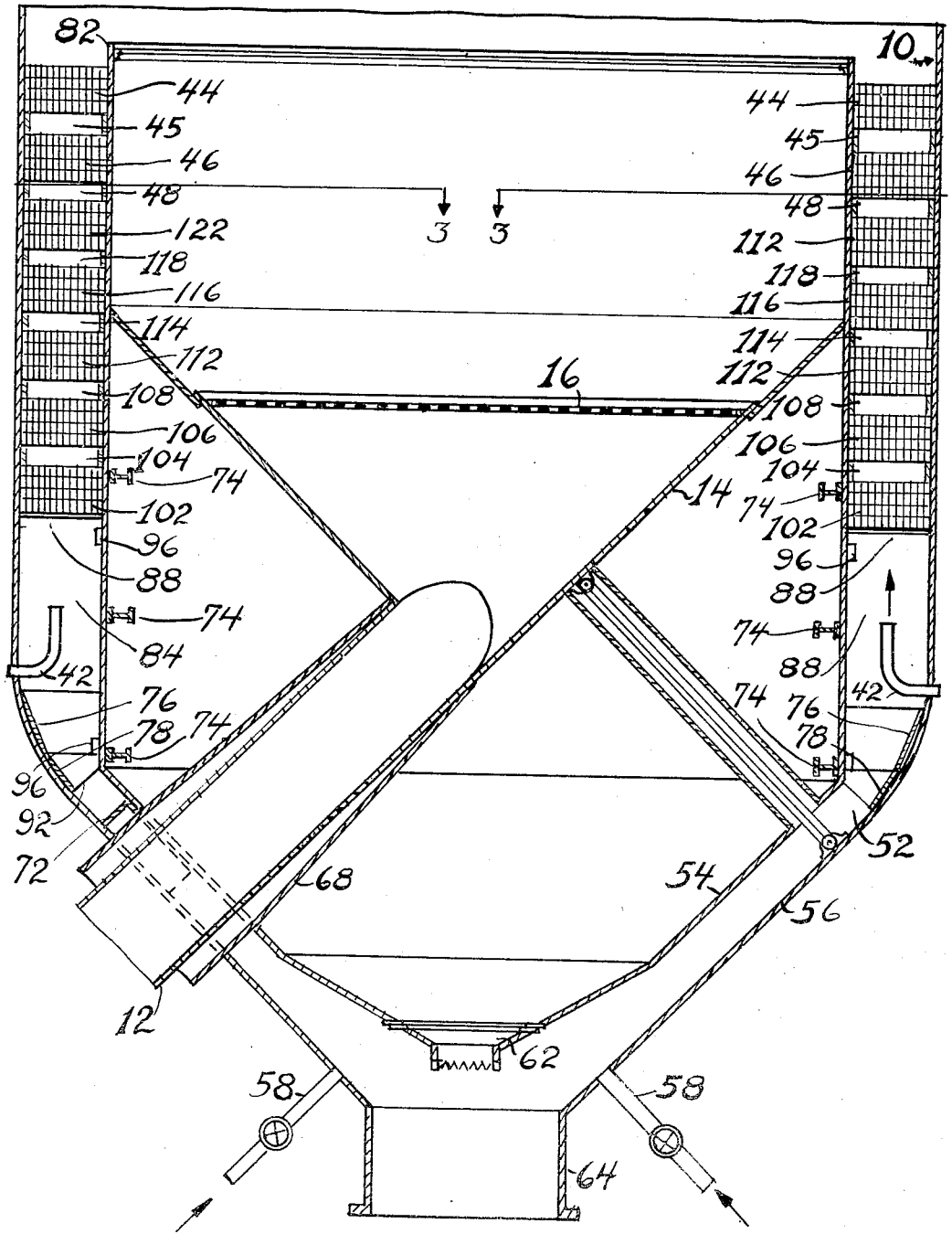
Fig. 2 represents a vertical longitudinal cross-section of the bottom portion of the reactor shown in Fig. 1 to show the stripping vessel in greater detail.

Referring now to Fig. 2, it will be seen that there is a conical elongated member 68 surrounding the inlet line 12. This is provided to permit expansion and contraction of the inlet line during the operation of the reactor. Surrounding the upper half of the conical member 68 between the conical member 54 and the bottom wall 56 of the reactor 10 is a semi-circular guard member 72 for protecting the conical member 68 against abrasion as the powdered material flows down through the passage 52. The lower portion of the inner cylindrical member 41 is strengthened by annular reinforcing members 74 welded to the inner wall of the cylindrical member 41. The bottom portion of the stripping section 40 is provided with annular wear plates 76 and 78 for protecting the inner wall of the reaction vessel 10 as the material flows from the stripper into the space 52. The top wear plate is arranged directly below the stripping gas inlet lines 42.

Figure 3:
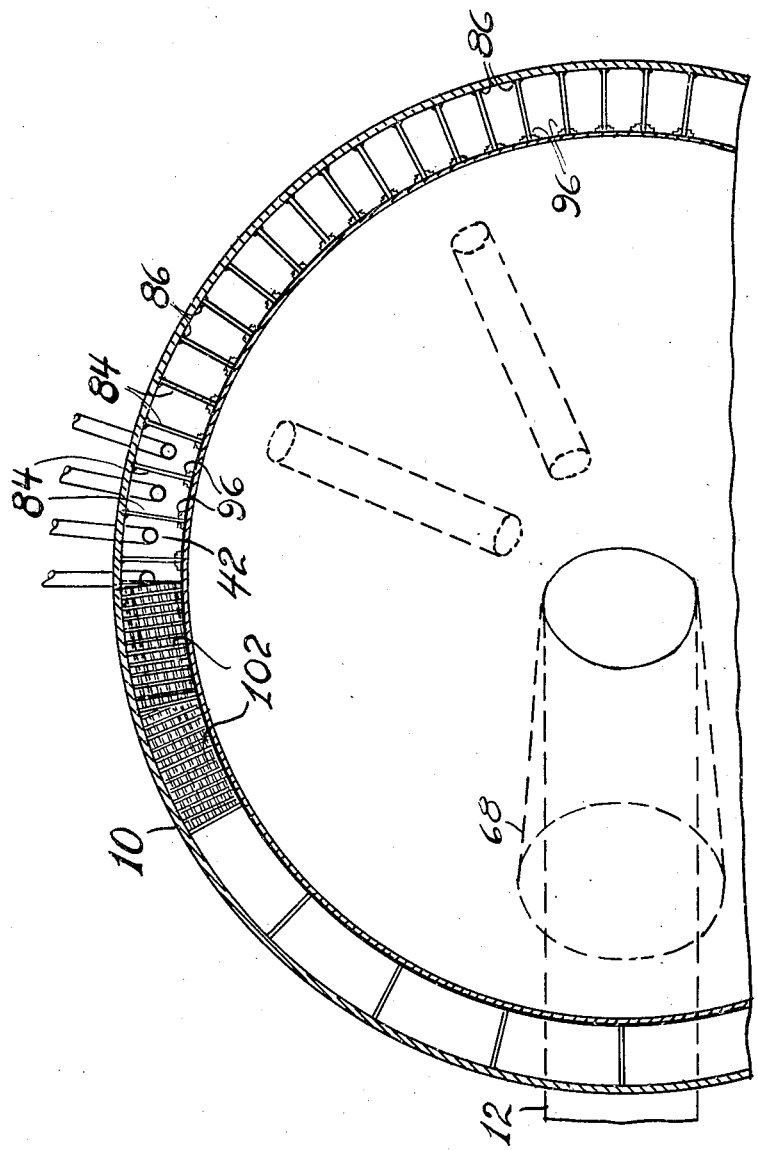
Fig. 3 represents a partial horizontal transverse cross-section of the vessel shown in Fig. 2, the section being taken substantially on line 3—3 of Fig. 2.

The lower portion of the annular stripping section is subdivided into a plurality of cells by vertically arranged partitions 84 as shown in Figs. 2 and 3. The outer ends of the partitions are welded to the inner wall of the bottom portion of the reaction vessel 10 or to a liner inside the reaction vessel 10. The partitions 84 extend from the level indicated at 88 to the level 92 adjacent the inlet to the passage 52. It will be seen that the partition plate has a rounded outer lower portion 94 to conform to the outline of the reaction vessel 10 at this place and the bottom portion of each partition is cut off at an angle as shown by the reference character 92.

The inner ends of each partition 84 are held in place by clips 96 shown in Figs. 2 and 3, the clips being L-shaped in cross-section and being welded or otherwise suitably secured to the outer wall of the inner cylindrical member 41. The partitions 84 are not welded to these clips but are merely held in place by the clips. While I have shown two clips 96, it is to be understood that the number of clips may be varied and more may be used, if desired.

The lowermost deep cellular member 102 rests on the top of the partitions 84. As shown in Fig. 3, the deep cellular member 102 is elongated and its length is equal to about the distance between three of the partitions 84. In the particular form shown in the drawing, there are six deep cellular members in each quarter of the annular stripping section and 18 partitions 84 in the same quarter of the annular stripping section. From this it will be seen that there is ample support for each deep cellular member.

Above the bottom deep cellular member 102 is a space 104. Above the space 104 is another deep cellular member 106 which is provided on its lower face with depending supporting and spacing means which will be presently described in greater detail. Above the deep cellular member 106 is another space 108 above which is another deep cellular member 112. Above the deep cellular member 112 is another space 114 above which is another deep cellular member 116. Above the deep cellular member 116 is another space 118 above which is another deep cellular member 122. Above the deep cellular member 122 is the space 48, the deep cellular member 46, the space 45 and the deep cellular member 44 in that order as previously described.

The top deep cellular member 44 is preferably arranged a short distance below the top 82 of the inner cylindrical member 41.

Figure 4:
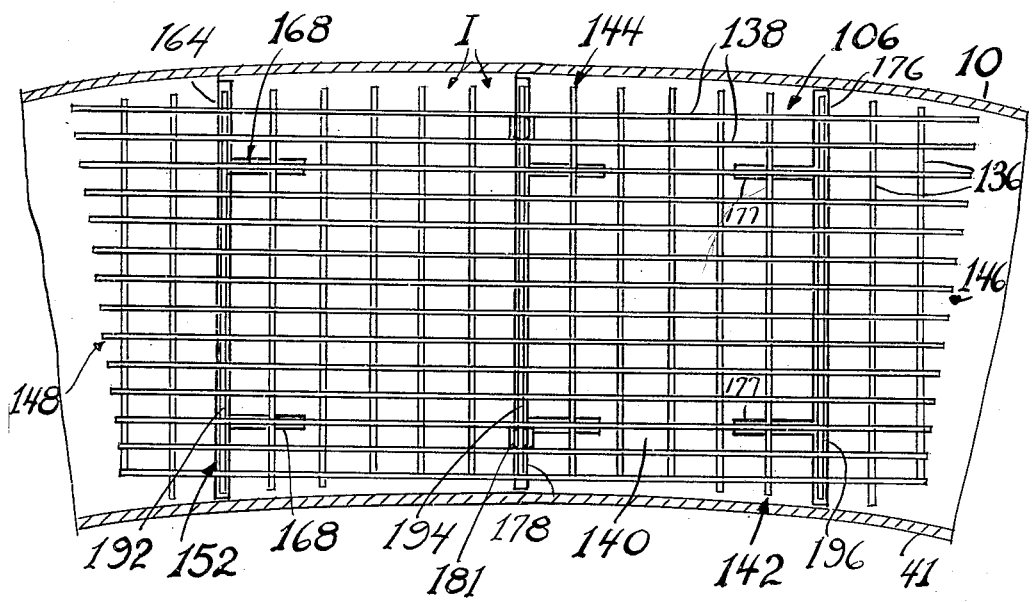
Fig. 4 is a top plan view of one of the deep cellular members.
Figure 5:
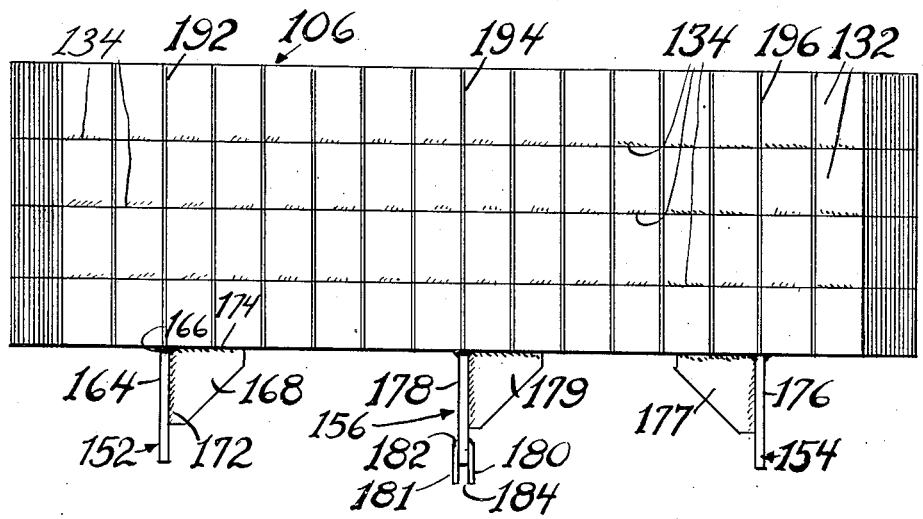
Fig. 5 represents a side elevation of the deep cellular member shown in Fig. 4.

Referring now to Figs. 4 and 5, the construction of the specific deep cellular member will be described. As shown in Fig. 5, the deep cellular member is formed by stacking subway grating sections 132 with the openings in alignment and welding or otherwise securing the sections together as shown at 134. As shown in Fig. 4, the deep cellular member 106, which comprises a cartridge or bundle of subway grating sections, is formed by relatively short transverse parallel spaced cross bars or strips 136 and longitudinally extending spaced parallel cross bars or strips 138 which extend at right angles to the bars or strips 136. In this way, rectangular openings 140 are provided. Due to the shape of the annular stripping section, certain of the end openings are of different configuration.

The inner longitudinal side of the cartridge or bundle 106 shown generally at 142 follows an arc to conform to the inner cylindrical member 41. The outer elongated side 144 follows an arc to conform to the cylindrical wall of the vessel 10. The ends 146 and 148 of the cartridge or bundle 106 are cut off at an angle or along a radial line so that the ends of adjacent bundles will be in abutting relation.

Referring now to Fig. 5, the supporting and spacing means will be described. In addition to being supporting and spacing means, the plates forming part of the spacing and supporting means function to separate the annular stripping section into vertical cells as will be explained in the description which follows. Depending from the bottom face of the bundle or cartridge 106 are the supporting means generally indicated 152, 154 and 156. The spacing and supporting means 152 comprises a rectangular metallic sheet having its upper end welded or otherwise secured to one of the cross bars of the bundle or cartridge 106. This rectangular plate is shown at 164 and has its upper end welded as at 166. The rectangular member 164 extends transversely entirely across the bundle or cartridge 106 as shown by the dotted lines in Fig. 4. At least two gusset pieces 168 are provided having one side at right angles to the rectangular piece 164 and welded thereto at 172. The other or top side of the gusset 168 is welded to one of the cross bars in the bundle or cartridge 106 as shown at 174. At least two of such gussets are used as indicated by the reference character 168 in Fig. 4.

On the other side of the cartridge 106 and depending from the lower face is another rectangular sheet 176 and a gusset 177 which are of similar construction to that just described in connection with the supporting means 152. The rectangular sheet 176 also extends transversely across the entire width of the cartridge or bundle 106.

The central supporting and spacing means 156 is similar to the other supporting means just described and includes rectangular sheet 178 and gusset 179 which are similar in construction to those just described. The flat metallic sheet 178 extends transversely across the entire width of the bundle or cartridge 106.

The central supporting and spacing means 156 differs from the other supporting means in that two or more clips are provided which extend below the lower end of the rectangular sheet 178. Each of these clips comprises two short strips of metal 180 and 181 having their upper ends 82 secured to the lower faces of the rectangular sheet 178 and extending below the lower end of the rectangular sheet 178 to provide a socket 184. In placing one of the cartridges above the other, the clips 180 are used to position and guide the cartridge or bundle. The socket 184 is arranged to straddle the central transverse cross bar of the next lower cartridge or bundle.

As above pointed out, the rectangular sheet members 176, 178 and 164 extend across the width of the cartridge or bundle and in effect form a continuation of certain of the vertical walls of the cartridge or bundle. For example, rectangular sheet 164 forms a continuation of the wall 192 in Figs. 4 and 5, rectangular sheet 178 forms a continuation of vertical wall 194 and rectangular sheet 176 forms a continuation of vertical wall 196 in the cartridge or bundle 106.

When the cartridges are aligned one above the other, elongated cells are provided throughout the length of the annular stripping section by the rectangular pieces cooperating with the vertical walls of the bundles or cartridges. With this construction, it is not necessary to provide vertical partitions extending throughout the length of the annular stripping section. The bundles or cartridges are spaced apart one above the other and at the same time elongated cells are provided by the form of separating and supporting means disclosed in connection with my invention.

While I have described in detail one method of supporting the cartridges or bundles by depending legs, it is also possible to obtain a similar construction and result by the use of superimposed legs. This will result in each bundle above resting on the extending legs of the bundle below. In effect, a similar type of construction may be used as shown in Fig. 5 with the exception that the top and bottom of the drawing would be exchanged. With this construction, bottom cellular member 102 would have legs extending from the top thereof and top cellular member 44 would have no legs.

It is also possible to obtain a similar apparatus by placing both depending and superimposed legs on alternate bundles used in construction of the stripper. In some instances this type of construction may have advantages of added economy in first cost. With this construction bottom cellular member 102, intermediate cellular members 112 and 122 and top cellular member 44 would have no legs and intermediate cellular members 106, 116 and 46 would have both depending and superimposed legs.

The apparatus as specifically described illustrates the division of a stripper by the extension of certain cross-members 136 (shown in Figs. 4 and 5 as members 192, 194 and 196) to meet the corresponding cross-members of the adjacent bundle above and/or below. It is also within the scope of this invention to extend similarly one or more longitudinal members 138 in each cellular member to further subdivide the cells formed by the bundles. In this case it may also be desirable to provide a partition or partitions similar to partitions 84, but at right angles thereto to extend the longitudinal subdivisions to a level lower than the lowest bundle. In this case also, a steam inlet similar to 42 should be provided for each cell so formed.

In the form of my invention as applied to commercial practice, the reaction vessel 10 has an internal diameter of about 23 feet. The stripping section has a width of about 1½ feet and a height from the top of the stripping line inlet 42 to the top of the inner cylindrical member 41 of about 14 feet. As shown in the drawing, and more particularly in Fig. 5, each cartridge or bundle is made up of 4 subway grating sections stacked one above the other with the openings in aligned relation and the subway grating sections welded together. Each bundle or cartridge has a depth of about 1 ft. and the space between the cartridges is about 5". The size of the bundles or cartridges may be varied and the spaces between the cartridges may be varied.

In the specific form of bundle or cartridge shown in Fig. 4, the cartridge has a length of about 2 ft. 7½ in. at its shorter side and about 2 ft. 11½ in. at its longer side.

In a catalytic cracking operation, the temperature in the reaction zone is about 940° F. and the fouled catalyst particles entering the upper portion of the stripping zone or section 40 is also about 940° F. Stripping gas, such as steam, oxygen free flue gas, carbon dioxide, nitrogen, etc., but preferably steam, is introduced at a temperature of about 350° F. The stripping gas flows upwardly countercurrent to the downflowing catalyst particles. During stripping the catalyst particles are maintained in a dense fluidized condition of about the same density as or perhaps slightly less than exists in the reaction zone or vessel 10. The spaces between the cellular cartridges or bundles are provided to redisperse the particles in the stripping gas and to prevent channeling of the gas through the smaller cells in the cartridges or bundles.

In a commercial unit the amount of catalyst stripped is about 800 lbs./minute per square foot of stripper area and the amount of steam is about 2½ lbs./minute per square foot.

In the specific form of the invention shown in the drawing, and more particularly in Fig. 3, there are 24 bundles or cartridges of subway grating in each layer and there are 7 layers of such bundles or cartridges in the stripping section. There are 72 short vertical partitions 84 and 72 stripping inlet pipes 42. From this it will be seen that for each cell formed by the partitions 84 at the bottom of the stripping zone there is one stripping gas inlet pipe 42.

While I have described the apparatus for stripping powdered solids from trapped or entrained gases as applied to a stripper of annular cross-section, I do not wish to limit myself to this particular arrangement. Use of the invention described may be made in strippers of circular cross-section either within the reaction vessel or in a separate vessel from the reaction vessel but joined to it by suitable conduit or conduits.

While I have shown the preferred form of my invention, it is to be understood that various changes and modifications may be made without departing from the spirit of my invention.

What is claimed is:

1. An apparatus of the character described for stripping solid particles which includes a vessel for contacting solid particles and gaseous fluid, means for introducing solid particles and gaseous fluid into said vessel, an annular stripping chamber in the lower part of said vessel through which particles are passed for stripping, said annular stripping chamber in its lower portion being subdivided into a plurality of cells by vertically arranged radial partitions, means for introducing stripping gas into said cells at the lower portion of said stripping chamber, a plurality of tiers of deep cellular members, each member comprising a plurality of longitudinal and transverse plates forming a multitude of long passageways of small cross-sectional area, the cellular members in each tier being arranged in abutting relation in order to substantially fill the cross-section of the annular stripping chamber, the lowermost tier of cellular members resting on the upper ends of said partitions and spacer bars between the several tiers of cellular members, each of said spacer bars being aligned with a plate of the cellular member above and below it, said aligned spacer bars and plates dividing the stripping chamber into vertical elongated cells.

2. An apparatus of the character described for stripping solid particles which includes a vessel for contacting solid particles and gaseous fluid, means for introducing solid particles and gaseous fluid into said vessel, an annular stripping chamber in the lower part of said vessel through which particles are passed for stripping, said annular stripping chamber in its lower portion being subdivided into a plurality of cells by vertically arranged partitions, a plurality of deep cellular members spaced one above the other and arranged around said annular stripping chamber, means for introducing stripping gas into said cells at the lower portion of said stripping chamber, the lowermost deep cellular members resting on the upper ends of said partitions, the deep cellular members above the lowermost members being provided with depending means for spacing and supporting the cellular members one above the other, said spacing means resting on the top surface of the next lower deep cellular member, said depending means being so formed and arranged to divide the spaces between said cellular members into a plurality of passageways.

3. An apparatus of the character described including a cylindrical vessel, means for introducing solid particles and gaseous fluid into said vessel, a smaller diameter cylinder in the lower part of said vessel and forming a deep annular space, said annular space being subdivided in its lower portion into a plurality of cells by vertically arranged partitions extending transversely of said space, a plurality of bundles of stacked grating sections in said annular space, said bundles being spaced one above the other in aligned relation and arranged around said annular space, means for introducing stripping gas into said cells at the lower portion of said stripping chamber formed by the vertically arranged partitions, the bottom bundles forming an annulus of about the same size as said annular space and resting on and supported by the upper ends of said partitions, the bundles above the bottom bundles being provided with bottom projecting means for spacing and supporting the bundles one above the other to form an annulus of bundles at different levels in said annular space, said spacing and supporting means resting on and supported by the upper surface of the next lower bundle, said depending means comprising of plurality of flat vertical plate members arranged in spaced relation and forming lower continuations of certain of the transverse cross bars of upper bundles so that the spaces between said bundles are subdivided into a plurality of passages so that the stripping gas in passing upwardly through said annular space is conducted through the cells of the bundles and through the passages in the spaces between said bundles.

4. An apparatus of the character described including a cylindrical vessel, means for introducing solid particles and gaseous fluid into said vessel, a smaller diameter cylinder in the lower part of said vessel and forming a deep annular space, said annular space being subdivided in its lower portion into a plurality of cells or passages by vertically arranged partitions extending transversely of said space, a plurality of bundles of stacked grating sections in said annular space, said bundles being spaced one above the other in aligned relation and arranged around said annular space, means for introducing stripping gas into said cells at the lower portion of said stripping chamber formed by the vertically arranged partitions, the bottom bundles forming an annulus of about the same size as said annular space and resting on and supported by the upper ends of said partitions, the bundles above the bottom bundles being provided with bottom projecting means for spacing and supporting the bundles one above the other to form an annulus of bundles at different levels in said annular space, said spacing and supporting means resting on and supported by the upper surface of the next lower bundle, said depending means comprising a plurality of flat vertical plate members arranged in spaced relation and forming lower continuations of certain of the transverse cross bars of upper bundles so that the space between said bundles is subdivided into a plurality of passages substantially the same in number as the bottom cells provided by said partitions so that the stripping gas is caused to follow vertical paths confined by said plate members in the spaces between said bundles.

5. An apparatus of the character described for stripping solid particles which includes a vessel for contacting solid particles and gaseous fluid, means for introducing solid particles and gaseous fluid into said vessel, a deep annular stripping chamber in the lower part of said vessel through which particles are passed for stripping, said annular stripping chamber in its lower portion being subdivided into a plurality of cells by vertically arranged partitions, a plurality of deep cellular members spaced one above the other and arranged around said annular stripping chamber abutting end to end to form annuli of deep cellular members spaced one above the other in said stripping chamber, means for introducing stripping gas into said cells at the lower portion of said stripping chamber, the bottom annulus of deep cellular members resting on and supported by the upper ends of said partitions, the deep cellular members in the next higher annulus being provided with depending means for spacing and supporting the cellular members in said next higher annulus, said spacing means resting on the top surface of the deep cellular member of the bottom annulus, said depending means comprising flat elongated vertical members, each forming a continuation of one wall of an upper cellular member to divide the stripping chamber into a plurality of elongated passageways.

6. An apparatus of the character described including a cylindrical vessel, means for introducing solid particles and gaseous fluid into said vessel, a smaller diameter cylinder in the lower part of said vessel and forming a deep annular space, said annular space being subdivided in its lower portion into a plurality of cells or passages by vertically arranged partitions extending transversely of said space, a plurality of bundles of stacked grating sections in said annular space, said bundles being arranged in abutting end to end relation around said annular space and spaced one above the other in aligned relation to form at least two annuli, means for introducing stripping gas into said cells at the lower portion of said stripping chamber formed by the vertically arranged partitions, the lowermost bundles forming an annulus of about the same size as said annular space and resting on and supported by the upper ends of said partitions, the bundles in the next higher annulus being provided with bottom projecting means for spacing and supporting the bundles in the said next higher annulus, said spacing and supporting means resting on and supported by the upper surface of the next lower annulus of bundles, said depending means comprising a plurality of flat vertical plate members arranged in spaced substantially parallel relation and forming lower continuations of certain of the transverse cross bars of upper bundles so that the space between said bundles is subdivided into a plurality of passages so that the stripping gas in passing upwardly through said annular space is conducted through the cells of the bundles and through the passages in the space between said bundles.

7. An apparatus of the character described including a cylindrical vessel, means for introducing solid particles and gaseous fluid into said vessel, a smaller diameter cylinder in the lower part of said vessel and forming a deep annular space, said annular space being subdivided in its lower portion into a plurality of cells or passages by vertically arranged partitions extending transversely of said space, a plurality of bundles of stacked grating sections in said annular space, said bundles being spaced one above the other in aligned relation and arranged around said annular space in end to end relation to form a plurality of annuli, means for introducing stripping gas into said cells at the lower portion of said stripping chamber formed by the vertically arranged partitions, the bottom bundles forming an annulus of about the same size as said annular space and resting on and supported by the upper ends of said partitions, the bundles in the annuli above the bottom annulus being provided with bottom projecting means for spacing and supporting the bundles one above the other to form an annulus of bundles at different levels in said annular space, said spacing and supporting means resting on and supported by the upper surface of the bundles in the next lower annulus, said depending means comprising a plurality of flat vertical plate members arranged in spaced substantially parallel relation and forming lower continuations of certain of the transverse cross bars of the grating of an upper bundle so that each bundle has more than one plate member and so that the space between the annuli of said bundles is subdivided into a plurality of passages substantially the same in number as the cells provided by said partitions whereby the stripping gas is caused to follow vertical paths confined by said plate members between said bundles.

8. An apparatus of the character described for stripping solid particles which includes a vessel for contacting solid particles and gaseous fluid, means for introducing solid particles and gaseous fluid into said vessel, an annular stripping chamber in the lower part of said vessel through which particles are passed for stripping, said annular stripping chamber in its lower portion being subdivided into a plurality of cells by vertically arranged partitions, a plurality of deep cellular members spaced one above the other and arranged around said annular stripping chamber, means for introducing stripping gas into said cells formed by said partitions at the lower portion of said stripping chamber, the lowermost deep cellular members resting on the upper ends of said partitions, means for spacing and supporting the cellular members one above the other, said spacing and supporting means comprising at least one flat elongated vertical member between each cellular member and forming a continuation of aligned walls of the cellular members arranged one above the other to form elongated passageways extending the full height of the several superposed members.

CHARLES W. TYSON.

REFERENCES CITED

The following references are of record in the file of this patent:

UNITED STATES PATENTS

| Number | Name | Date |
|---|---|---|
| 2,213,798 | Anne | Sept. 3, 1940 |
| 2,359,310 | Hemminger | Oct. 3, 1944 |
| 2,394,814 | Snuggs | Feb. 12, 1946 |